United States Patent [19]
Roof

[11] Patent Number: 5,700,368

[45] Date of Patent: *Dec. 23, 1997

[54] TREATMENTS TO REDUCE ALDOL CONDENSATION AND SUBSEQUENT POLYMERIZATION IN CAUSTIC ACID GAS SCRUBBERS

[75] Inventor: Glenn L. Roof, Sugar Land, Tex.

[73] Assignee: Baker Hughes Incorporated, Houston, Tex.

[*] Notice: The portion of the term of this patent subsequent to May 25, 2015, has been disclaimed.

[21] Appl. No.: 450,366

[22] Filed: May 25, 1995

[51] Int. Cl.[6] ........................... C10G 9/16
[52] U.S. Cl. ............ 208/48 AA; 210/696; 210/698; 210/699; 208/95; 208/236; 252/186.28; 252/186.39; 252/187; 252/186.1
[58] Field of Search ................ 208/48 AA, 95, 208/236; 210/696, 698, 699; 252/186.28, 186.39, 181.01, 187

[56] References Cited

U.S. PATENT DOCUMENTS

| | | | |
|---|---|---|---|
| 2,909,486 | 10/1959 | Colichman | 252/74 |
| 3,130,148 | 4/1964 | Gleim | 208/189 |
| 3,230,225 | 1/1966 | Arrigo | 260/290 |
| 3,380,960 | 4/1968 | Ebner | 260/666.5 |
| 3,396,154 | 8/1968 | Chamberlin et al. | 260/855 |
| 3,737,475 | 6/1973 | Mason | 260/683.15 |
| 3,769,268 | 10/1973 | George | 260/89.5 |
| 3,914,205 | 10/1975 | Gorecki et al. | 260/89.5 |
| 3,989,740 | 11/1976 | Broussard et al. | 260/486 |
| 4,020,109 | 4/1977 | Fleck et al. | 260/601 |
| 4,085,267 | 4/1978 | Morningstar et al. | 526/674 |
| 4,269,954 | 5/1981 | Morningstar et al. | 526/62 |
| 4,376,850 | 3/1983 | Sanner | 526/62 |
| 4,439,311 | 3/1984 | O'Blasny | 208/48 AA |
| 4,536,236 | 8/1985 | Haas | 556/62 |
| 4,585,579 | 4/1986 | Bommaraju et al. | 208/48 AA |
| 4,628,132 | 12/1986 | Miller . | |
| 4,673,489 | 6/1987 | Roling | 208/289 |
| 4,952,301 | 8/1990 | Awbrey | 208/8 AA |
| 5,160,425 | 11/1992 | Lewis | 585/95 |
| 5,194,143 | 3/1993 | Roling | 208/48 AA |
| 5,220,103 | 6/1993 | Tagamolila et al. . | |
| 5,220,104 | 6/1993 | McDaniel et al. | 585/853 |
| 5,288,394 | 2/1994 | Lewis et al. | 208/48 AA |
| 5,527,447 | 6/1996 | Roof | 208/48 AA |

FOREIGN PATENT DOCUMENTS

| | | |
|---|---|---|
| 0 227 259 | 7/1987 | European Pat. Off. . |
| 0 552 056 A1 | 7/1993 | European Pat. Off. . |
| 52-150778 A | 12/1977 | Japan . |
| 721233 | 1/1955 | United Kingdom . |
| 1058429 | 2/1967 | United Kingdom . |

OTHER PUBLICATIONS

Doinikov, et al. "Metallistation of plastic dentures—by treating in aq. soln.of mono:ethanolamine, sodium hydroxide and surfacant prior to etching in sulphuric acid and hydrogen peroxide, and metallising." *Derwent Publications Ltd.* London, GB Section Ch, Week 9226 (Sep. 30, 1991).

"Plant for treating sodium hypochlorite–contg. waste water—comprises vessel for storing the waste water and tower packed with nickel oxide catalyst." *Derwent Publications Ltd.* London, GB Section Ch, Week 8736 (Aug. 3, 1987).

Yoshida "Process for Removing Nitrogen Oxides in Atmospheric Airor in Gas." *Patent Abstracts of Japan* 10:28 (C–326) (Sep. 13, 1985).

"Converting sulphur cpds. in waste hydroxide soln. to Glaubers salt—by adding hydrogen peroxide soln. and sodium hydroxide soln. and decomposing excess hydrogen peroxide." *Derwent Publications Ltd.* London, GB Section Ch, Week 7805 (Dec. 14, 1977).

Nagase "Collection of Iodine in Gas." *Patent Abstracts of Japan* 13:431 (C–640) (Jun. 30, 1989).

Okubo "Polythiol Compound, Optical Material and Optical Product Obtained by using Same Compound." *Patent Abstracts of Japan* 16:20 (C–0902) (Oct. 22, 1991).

"Mechanism of soap browning uncovered." *Computational Chemistry*, p. 42 (Sep. 16, 1996).

PSP Patent Bibliography 1955–1979, Process Stream Purification.

Chemical Abstracts, 119:118165, vol. 119, 1993, p. 25.

Herbert O. House, Modern Synthetic Reactions, 2nd edt., pp. 45–53, 71–73.

Jerry March, Advanced Organic Chemistry, 2nd edt., 1977, pp. 829–833, 1116–1118.

*Primary Examiner*—Helane Myers
*Attorney, Agent, or Firm*—Madan & Morris, PLLC

[57] ABSTRACT

The present invention provides a number of agents that are useful to inhibit aldol condensation in caustic scrubbers. Preferred agents include, but are not necessarily limited to benzoic hydrazide, hydroperoxides, hydrogen peroxide, salts of hypochlorous acid, nitroalkanes, monoethanolamine, peroxyesters, and N,N-dialkylhydroxylamines.

21 Claims, No Drawings

TREATMENTS TO REDUCE ALDOL CONDENSATION AND SUBSEQUENT POLYMERIZATION IN CAUSTIC ACID GAS SCRUBBERS

FIELD OF THE INVENTION

The present invention relates to the use of agents to reduce fouling caused by aldol condensation in caustic acid gas scrubbers ("caustic scrubbers").

BACKGROUND OF THE INVENTION

Refineries employ atmospheric and vacuum distillation towers to separate crude oil into narrower boiling fractions. These fractions then are converted into fuel products, such as motor gasoline, distillate fuels (diesel and heating oils), and bunker (residual) fuel oils. Some of the low boiling fractions from various units of the refinery are directed to petrochemical plants, where they are further processed into highly refined chemical feedstocks to be used as raw materials in the manufacture of other types of products, such as plastics and basic chemicals.

During the refining of petroleum, hydrocarbon streams typically are treated in an amine scrubber, such as a DEA or MEA scrubber, to remove acid gases, such as hydrogen sulfide and carbon dioxide. In a petrochemical plant, hydrocarbon streams typically are treated for the same purpose in a caustic scrubber. All of these scrubbers herein are referred to as "acid gas" scrubbers. The hydrocarbon stream entering an acid gas scrubber may contain aldehydes and ketones, their precursors, such as vinyl acetate, or other impurities, that are hydrolyzed or otherwise converted to aldehydes and salts of organic acids in the highly alkaline environment of an acid gas scrubber. Such compounds will herein be referred to as "reactive compounds." These reactive compounds either (a) contain carbonyls, or (b) form carbonyls under highly alkaline conditions that are susceptible to classic aldol condensation reactions. Carbonyls that are susceptible to classic aldol condensation reactions hereinafter will be referred to as "reactive carbonyls."

Under highly alkaline conditions, lower molecular weight aldehydes, such as propionaldehyde (propanal) and especially acetaldehyde (ethanal), readily undergo base catalyzed aldol condensation at ambient temperatures. The result is the formation of oligomers and polymers which precipitate out of the scrubbing solution as viscous oils, polymeric gums, and solids. These precipitates can foul the processing equipment and result in the reduction of processing throughput and costly equipment maintenance or repair.

In the past, organic reducing agents or organic and inorganic oxidizing agents have been proposed to prevent such polymerization. These organic agents might successfully retard polymerization in acid gas scrubbers; however, the organic agents also tend to undergo other reactions which can reduce their effectiveness as aldol condensation inhibitors.

Effective and economical methods for retarding aldol condensation in acid gas scrubbers would be highly desirable.

SUMMARY OF THE INVENTION

The present invention provides a number of agents that are useful to inhibit aldol condensation in caustic scrubbers. Preferred agents include, but are not necessarily limited to benzoic hydrazide, hydroperoxides, hydrogen peroxide, salts of hypochlorous acid, nitroalkanes, monoethanolamine, peroxyesters, and N,N-dialkylhydroxylamines.

DETAILED DESCRIPTION OF THE INVENTION

The present invention is directed to reactions that cause fouling in caustic scrubbers. Without limiting the present invention, it is believed that the red precipitate that forms in acid gas scrubbers is the result of several aldol condensation/ dehydration steps. As used herein, the term "aldol condensation" is intended to refer to the reactions that ultimately result in the formation of a precipitate in acid gas scrubbers. The inhibiting agents of the present invention are believed to inhibit fouling by inhibiting such aldol condensation.

Agents that inhibit aldol condensation in caustic scrubbers include benzoic hydrazide, hydroperoxides, hydrogen peroxide, salts of hypochlorous acid, such as NaOCl and $Ca(OCl)_2$, nitroalkanes, monoethanolamine, peroxyesters, 3-methoxypropylamine, and N,N-dialkylhydroxylamines. Preferred inhibiting agents are benzoic hydrazide, tertiary-butyl hydroperoxide, hydrogen peroxide, NaOCl (commonly available as a 3.62% solution), nitromethane, monoethanolamine, tertiary-butyl perbenzoate, and N,N-diethylhydroxylamine. Most preferred agents are benzoic hydrazide and t-butyl hydroperoxide.

Preferred hydroperoxides are tertiary-butyl or cumene hydroperoxide, which are commercially available from Elf Atochem North America, Inc., 2000 Market Street, Philadelphia, Pa. A preferred form of hydrogen peroxide is a 30% solution of hydrogen peroxide, available from EM Science, a division of EM Industries, Inc., 5 Skyline Drive, Hawthorne, N.Y.

Preferred nitroalkanes have the structure $R—NO_2$, wherein R is a straight, branched, or cyclic alkyl group having between about 1–8 carbon atoms. A preferred nitroalkane is nitromethane, which is commercially available from Angus Chemical Co., 1500 East Lake Cook Road, Buffalo Grove, Ill.

Preferred peroxyesters are tertiary-butyl perbenzoate, tertiary-butyl peroxyacetate, tertiary-butyl peroxypivalate, tertiary-butyl peroxy-2-ethylhexanoate, and tertiary-amyl peroxy-2-ethylhexanoate, which are commercially available from Elf Atochem North America Inc.

Preferred N,N-dialkylhydroxylamines have the general formula $R_2N—OH$, wherein R is selected from the group consisting of straight, branched, and cyclic alkyl groups having between about 1–10 carbon atoms, aryl groups, alkaryl groups, and aralkyl groups. A preferred N,N-dialkylhydroxylamine is N,N-diethylhydroxylamine, which is commercially available from Elf Atochem.

Certain agents inhibit aldol condensation in caustic scrubbers, but are not as soluble in the caustic scrubbing solution, or form a slight precipitate. These agents are less preferred, but still function in the present invention. These agents include isothiuronium salts, primary amines, acetophenone, dibutylamine, and iodine.

A preferred isothiuronium salt is benzyl isothiuronium chloride, which may be synthesized as shown in Example 1. Persons of skill in the art can alter the procedures of Example 1 to synthesize other isothiuronium salts.

Preferred primary amines have the general structure $R—NH_2$, wherein R is selected from the group consisting of straight, branched, and cyclic alkyl groups, preferably having between about 1–20 carbon atoms, wherein one or more of said carbon atoms can be replaced by an oxygen atom to result in an "ethereal amine," aryl, alkaryl, and aralkyl groups, and heterocyclic alkyl groups containing oxygen or tertiary nitrogen as a ring constituent. Preferred primary amines include, but are not necessarily limited to arylamines, aralkylamines, ethereal amines, and cyclic alkyl amines.

A preferred arylamine is aniline; a preferred aralkylamine is benzylamine; a preferred ethereal amine is 3-methoxypropylamine; and, a preferred cyclic alkyl amine is cyclohexylamine. Aniline is commercially available from Uniroyal Chemical co., Inc., Specialty Chemicals, Middlebury, Conn. Benzylamine, 3-methoxypropylamine, and cyclohexylamine are commercially available from BASF Corp., 3000 Continental Drive, North Mount Olive, N.J.

Acetophenone and iodine are commercially available from a number of sources. Dibutylamine is commercially available from BASF Corp.

Preferably, the inhibiting agent should be injected into the scrubber slowly, on an "as-needed" basis. Due to substantially continuous mode of operation of most scrubbers, it is believed that the agent should reach a steady state during processing. An equimolar ratio of inhibiting agent to active carbonyl containing compound should be sufficient to inhibit aldol condensation. Even less than a 1:1 ratio may be sufficient. An excess of the inhibiting agent also may be added, if desired.

The agents of the present invention will react with the reactive carbonyls, or a condensation product of two or more reactive carbonyls, in the caustic scrubber at ambient temperatures. Therefore, the hydrocarbon stream need not be heated, and heating is neither necessary nor advisable.

The invention will be more readily understood with reference to the following examples.

EXAMPLE 1

Thiourea (7.60 g; 100 mmoles) was added to 150 ml of ethanol in a 250 ml Erlenmeyer flask. The mixture was heated to reflux to dissolve almost all of the thiourea. After cooling the contents to 40° C., benzyl chloride (12.6 g; 100 mmoles) was added dropwise over three minutes. The slightly hazy solution was refluxed overnight, causing it to become clear. In the morning, the ethanol was stripped off on the rotary evaporator leaving a good yield of a white solid. NMR analysis of the white solid showed it to be benzyl-isothiuronium chloride.

EXAMPLE 2

A number of screening tests were performed to ascertain agents that would reduce aldol condensation and fouling in caustic scrubbers. To perform the screening, 2 oz. bottles were dosed with at least 3.24 mmoles of each candidate, followed by 25 ml of 10% NaOH. Each bottle was then shaken. Subsequently, 100 μl of vinyl acetate (4000 ppm, or 1.08 mmoles) was added to each bottle, and the appearance of each solution was noted at 4 hours, 26 hours, and 72 hours. The solutions were evaluated for color and precipitate. Candidates that exhibited no color, or only slight color, and no precipitation were selected for further study. Approximately 20 candidates were further tested in the following examples.

EXAMPLE 3

In the following experiment, with the exception of candidate No. 1, 2 oz. bottles were dosed with 1.19 mmoles of candidate, as shown in Table I.

TABLE I

| SAMPLE | CANDIDATE | SOURCE | MW | AMT. OF CANDIDATE ADDED | MMOLES CANDIDATE ADDED |
|---|---|---|---|---|---|
| 1 | 70% tertiary-butyl hydroperoxide | Arco Chemical Co. | 90 | 268 μl | 2.08 |
| 2 | tertiary-butyl perbenzoate | Aztec Catalyst Co. | 194 | 164 μl | 1.19 |
| 3 | Benzyl-isothiuronium chloride | Synthesized as in Ex. 1 | 202 | 240 mg | 1.19 |

*In the tables, "Ph" stands for phenyl.

After dosing the bottles, 25 ml of 10% NaOH was added to each. Subsequently, 100 μl of vinyl acetate (1.08 mmoles) was added to each bottle, and the color of the solution and any precipitate was noted after 6.5 hours and again after 21.5 hours. The results are reflected in Table II.

TABLE II

| SAMPLE | 6.5 HOURS | 21.5 HOURS |
|---|---|---|
| Blank | Dark yellow; heavy haze | Yellow solution; red flocculated precipitate |
| 1 | Light yellow; no haze or precipitate | Light yellow; no haze or precipitate |
| 2 | Bright yellow; no haze or precipitate | Dark yellow; no haze or precipitate |
| 3 | Yellow and hazy | Light yellow; insoluble candidate; no red precipitate |

Based on the foregoing, candidates 1 (t-butyl hydroperoxide) and 2 (t-butyl perbenzoate) appear to be suitable agents for inhibiting aldol condensation in caustic scrubbers because, although the solution is colored, no haze or precipitate is formed. Candidate 3 (benzyl isothiuronium chloride) may be suitable for use in caustic scrubbers, although unreacted candidate remains insoluble in the scrubber substrate.

EXAMPLE 4

The procedures of Example 3 were followed to test a second batch of target candidates given in Table III:

TABLE III

| SAMPLE | CANDIDATE | SOURCE | MW | AMT. OF CANDIDATE ADDED (mg) | MMOLES OF CANDIDATE |
|---|---|---|---|---|---|
| Blank | — | — | — | — | — |
| 1 | Aniline | Aldrich Chemical Co. | 93.1 | 111 | 1.19 |
| 2 | Benzylamine | Aldrich Chemical Co. | 107 | 127 | 1.19 |
| 3 | Benzoic Hydrazide | Aldrich Chemical Co. | 136 | 162 | 1.19 |
| 4 | Acetaldehyde Oxime | Allied Signal | 59.1 (D = 0.969) | 70.3 | 1.19 |

TABLE III-continued

| SAMPLE | CANDIDATE | SOURCE | MW | AMT. OF CANDIDATE ADDED (mg) | MMOLES OF CANDIDATE |
|---|---|---|---|---|---|
| 5 | methyl-ethyl-ketoxime | Aldrich Chemical Co. | 87.1 | 104 | 1.19 |
| 6 | aceto-phenone | Aldrich Chemical Co. | 120 (D = 1.03) | 143 | 1.19 |
| 7 | $CH_3-NO_2$ | Aldrich Chemical Co. | 61.0 (D = 1.13) | 73 | 1.19 |
| 8 | $(H_2N)_2C=S$ | Malinck-rodt | 76.1 | 91 | 1.19 |
| 9 | $Bu_2NH$ | BASF Corp. | 129 (D = 0.767) | 154 | 1.19 |

The results are shown in Table IV:

TABLE IV

| SAMPLE | 3 HOURS | 21.5 HOURS |
|---|---|---|
| Blank | Yellow and hazy | Yellow and red flocculent precipitate |
| 1 | Light yellow and hazy (probably due to insolubility of aniline) | Light yellow; no red precipitate; excess insoluble candidate on top |
| 2 | Colorless and hazy | Colorless; hazy due to insoluble candidate |
| 3 | Colorless; no haze or precipitate | Colorless; no haze or precipitate |
| 4 | Yellow with very slight haze | Yellow and red flocculent precipitate |
| 5 | Yellow and hazy | Yellow and red flocculent precipitate |
| 6 | Light yellow and hazy (could be due to insolubility of candidate) | Yellow; no red precipitate; green haze due to insoluble candidate |
| 7 | Almost colorless; no haze or precipitate | Yellow, no flocculent or haze |
| 8 | Yellow and hazy | Yellow with red flocculent precipitate |
| 9 | Light yellow and haze (could be due to $Bu_2NH$) | Yellow; no red precipitate; red oil on top due to insoluble candidate |

Based on the foregoing, candidate 3 (benzoic hydrazide) is a preferred agent for inhibiting aldol condensation in caustic scrubbers because the solution is colorless and no haze or precipitate is formed. Candidate 7 (nitromethane) appears to be a suitable agent for inhibiting aldol condensation in caustic scrubbers because, although the solution is colored, no haze or precipitate is formed. Candidates 1, 2, 6, and 9—aniline, benzylamine, acetophenone, and dibutylamine, respectively—may be suitable for use in caustic scrubbers, although unreacted candidate remains insoluble in the scrubber substrate.

EXAMPLE 5

The procedures of Example 3 were followed to test a third batch of target candidates given in Table V:

TABLE V

| SAMPLE | CANDIDATE | SOURCE | MW | AMT. OF CANDIDATE ADDED (mg) | MMOLES OF CANDIDATE |
|---|---|---|---|---|---|
| Blank | — | — | — | — | — |
| 1 | $(PhO)_3P$ | Bright & Wilson | 310 | 369 | 1.19 |
| 2 | $(MeO)_3P$ | Aldrich Chemical Co. | 124 | 148 | 1.19 |
| 3 | DEA | Aldrich Chemical Co. | 105 | 125 | 1.19 |
| 4 | MEA | Fisher Scientific | 61.1 | 73 | 1.19 |
| 5 | Benzalde-hyde | Aldrich Chemical Co. | 106 | 126 | 1.19 |
| 6 | 2 moles benzalde-hyde/1 mole acetone | — | 106/58 | 252/69 | 1.19 (of reaction product) |
| 7 | 30% $H_2O_2$ | EM Science | 34 | 135 | 1.19 |
| 8 | 3.62% NaOCl | Commercial Bleach | 74.4 | 2,440 | 1.19 |
| 9 | $I_2$ | Malinck-rodt | 254 | 302 | 1.19 |

The results are shown in Table VI:

TABLE VI

| SAMPLE | 1 HOUR | 21.5 HOURS |
|---|---|---|
| Blank | Bright yellow and slight haze | Yellow and red flocculent precipitate |
| 1 | Bright yellow and slight haze | Yellow and red flocculent precipitate |
| 2 | Light yellow and hazy (due to insolubility of candidate) | Yellow and red flocculent precipitate |
| 3 | Yellow and slight haze | Yellow and red flocculent precipitate |
| 4 | Colorless, no haze or precipitate | Yellow and no haze or precipitate |
| 5 | Yellow and cloudy (could be due to insolubility of candidate) | Yellow, red haze and some red precipitate |
| 6 | Bright yellow and cloudy (could be due to insolu-bility of candidate) | Yellow, red haze and some red precipitate |
| 7 | Colorless; no haze or precipitate | Yellow, but no haze or precipitate |
| 8 | Light yellow, no haze or precipitate | Yellow, no haze or precipitate |
| 9 | Yellow, no haze or precipitate | Dark yellow, plus slight haze |

Based on the foregoing, candidate 4 (MEA), 7 (hydrogen peroxide), and 8 (NaOCl) appear to be suitable agents for inhibiting aldol condensation in caustic scrubbers because, although the solution is colored, no haze or precipitate is formed. Candidate 9 (iodine) may be suitable for use in caustic scrubbers in spite of the small amount of haze present.

EXAMPLE 6

The following experiment was designed to test the promising candidates from the final candidate selection tests using recycled caustic solution from an actual caustic scrubber. A one-half quart sample of a customer's "recycle sodium hydroxide solution" was yellow and contained particulates. The caustic solution was vacuum filtered to remove particulates. Except for candidate 4, 2 oz. bottles were dosed to achieve a final concentration of at least 1.1 moles of candidate per 1.0 moles of vinyl acetate. Approximately 1.18–1.19 mmoles of candidate were added to each bottle. 25 ml of the filtered caustic solution was added to each bottle and the contents were shaken 100 times. The bottles were dosed with 100 μl (1.08 mmoles) of vinyl acetate, and the bottles were shaken 50 times. The candidates and the amount of each candidate added is given in Table VII:

TABLE VII

| SAMPLE | CANDIDATE | SOURCE | MW | AMT. OF CANDIDATE ADDED | MMOLES CANDIDATE ADDED |
|---|---|---|---|---|---|
| Blank | — | — | — | — | — |
| 1 | Benzoic hydrazide | Aldrich Chemical Co. | 136 | 162 mg | 1.19 |
| 2 | 70% tertiary-butyl hydroperoxide | Arco Chemical Co. | 90 | 268 mg | 2.08 |
| 3 | tertiary-butyl perbenzoate | Aztec Catalyst Co. | 194 | 231 mg | 1.19 |
| 4 | CH$_3$NO$_2$ | Aldrich Chemical Co. | 61.0 | 73 mg | 1.20 |
| 5 | MEA | Fisher Scientific | 61.1 | 73 mg | 1.19 |
| 6 | 30% H$_2$O$_2$ | EM Science | 34 | 135 mg | 1.19 |
| 7 | 3.62% NaOCl | Commercial Bleach | 74.4 | 2,440 mg | 1.19 |

The bottles were observed for color and precipitation at 3.5 hours and again at 24 hours. The results are shown in Table VIII:

TABLE VIII

| SAMPLE | 3.5 HOURS | 24 HOURS |
|---|---|---|
| Blank | Yellow and very hazy | Light red, hazy, and red flocculent precipitate. |
| 1 | Light yellow, no haze or precipitate | Light yellow, no haze or precipitate |
| 2 | Light yellow, no haze or precipitate | Light yellow, no haze or precipitate |
| 3 | Yellow, no haze or precipitate (undissolved candidate on top) | Yellow, no haze or precipitate (undissolved candidate on top) |
| 4 | Light yellow, no haze or precipitate | Yellow, no haze or precipitate |
| 5 | Light yellow, no haze or precipitate | Yellow, no haze or precipitate |
| 6 | Light yellow, no haze or precipitate | Yellow, no haze or precipitate |
| 7 | Yellow, no haze or precipitate | Yellow, no haze precipitate |

Based on the foregoing candidates 1 (benzoic hydrazide), and 2 (t-butyl hydroperoxide) are preferred agents for inhibiting aldol condensation in caustic scrubbers because the solution has only very slight color, and no haze or precipitate is present. Candidates 4, 5, 6, and 7—nitromethane, MEA, hydrogen peroxide, and NaOCl respectively—appear to be suitable agents for inhibiting aldol condensation in caustic scrubbers because, although the solution is colored, no haze or precipitate is formed. Candidate 3 (t-butyl perbenzoate) may be suitable for use in caustic scrubbers even though some precipitate was present. Note that no precipitate was observed using t-butyl perbenzoate in Example 3.

EXAMPLE 7

The procedures of Example 3 were followed, except that a molar ratio of candidate to vinyl acetate of 1.5 was used instead of a molar ratio of 1.1, to test several additional candidates given in Table IX:

TABLE IX

| SAMPLE | CANDIDATE | SOURCE | MW | AMT. OF CANDIDATE (mg) | MMOLES OF CANDIDATE |
|---|---|---|---|---|---|
| Blank | — | — | — | — | — |
| 1 | 3-methoxy-propyl-amine | Union Carbide | 89.1 | 144 | 1.62 |
| 2 | Cyclohexyl-amine | Aldrich | 99.2 | 161 | 1.62 |
| 3 | N,N-diethyl-hydroxyl-amine | Aldrich | 89.1 | 144 | 1.62 |

The results are shown in Table X:

TABLE X

| SAMPLE | OBSERVATION AT 67 HOURS |
|---|---|
| Blank | Red solution; heavy red haze. |
| 1 | Yellow solution; very slight haze. |
| 2 | Light yellow solution; slight haze; no precipitate; some insoluble candidate on top. |
| 3 | Dark yellow solution; no haze or precipitate. |

Based on the foregoing, candidates 1 (3-methoxypropylamine), 2 (cyclohexylamine), and 3 (N,N-diethylhydroxylamine) all appear to be a suitable agents for inhibiting aldol condensation in caustic scrubbers. Candidate 1 (3-methoxypropylamine) is suitable because, even though a slight haze was produced, the haze was much less than that produced in the blank. Candidate 2 (cyclohexylamine) is suitable because no precipitate was formed and the slight haze appeared to be candidate. Candidate 3 (N,N-diethylhydroxylamine) is suitable because, although the solution is colored, no haze or precipitate is formed.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A method for inhibiting aldol condensation in caustic scrubbers comprising the step of treating a caustic scrubbing solution comprising hydrocarbons with an inhibiting agent in an amount sufficient to inhibit said aldol condensation, wherein said inhibiting agent is selected from the group consisting of benzoic hydrazide, hydroperoxides, hydrogen peroxide, salts of hypochlorous acid, nitroalkanes, monoethanolamine, peroxyesters, and N,N-dialkylhydroxylamines.

2. A method for inhibiting aldol condensation in caustic scrubbers comprising the step of treating a caustic scrubbing solution comprising hydrocarbons with an inhibiting agent in an amount sufficient to inhibit said aldol condensation, said inhibiting agent being selected from the group consisting of benzoic hydrazide, tertiary-butyl hydroperoxide, hydrogen peroxide, NaOCl, Ca(OCl)$_2$, nitromethane, monoethanolamine, tertiary-butyl perbenzoate, and N,N-diethylhydroxylamine.

3. The method of claim 1 where wherein said inhibiting agent is selected from the group consisting further of isothiuronium salts, primary amines, acetophenone, dibutylamine, and iodine.

4. The method of claim 1 wherein said inhibiting agent comprises benzoic hydrazide.

5. The method of claim 1 wherein said inhibiting agent comprises a hydroperoxide.

6. The method of claim 5 wherein said hydroperoxide is selected from the group consisting of tertiary-butyl hydroperoxide and cumene hydroperoxide.

7. The method of claim 1 wherein said inhibiting agent comprises hydrogen peroxide.

8. The method of claim 1 wherein said inhibiting agent comprises a salt of hypochlorous acid.

9. The method of claim 1 wherein said inhibiting agent comprises monoethanolamine.

10. The method of claim 1 wherein said inhibiting agent comprises a peroxyester.

11. The method of claim 10 wherein said peroxyester is selected from the group consisting of tertiary-butyl perbenzoate, tertiary-butyl peroxyacetate, tertiary-butyl peroxypivalate, tertiary-butyl peroxy-2-ethylhexanoate, and tertiary-amyl peroxy-2-ethylhexanoate.

12. The method of claim 1 wherein said inhibiting agent comprises a nitroalkane having the structure

R—NO$_2$ wherein R is selected from the group consisting of straight, branched, and cyclic alkyl groups having between about 1–8 carbon atoms.

13. The method of claim 1 wherein said inhibiting agent comprises nitromethane.

14. The method of claim 3 wherein
said isothiuronium salt comprises benzyl isothiuronium chloride;
said primary amine is selected from the group consisting of an arylamine, an aralkylamine, an ethereal amine, and a cyclic alkyl amine.

15. The method of claim 3 wherein said inhibiting agent comprises a primary amine selected from the group consisting of aniline, benzylamine, 3-methoxypropylamine, and cyclohexylamine.

16. The method of claim 1 wherein said hydrocarbon stream contains a molar concentration of reactive carbonyls, and wherein said hydrocarbon stream is treated with a molar amount of said inhibiting agent that is at least substantially the same as said molar amount of said reactive carbonyls.

17. A caustic scrubbing solution comprising hydrocarbons and an inhibiting agent in an amount sufficient to inhibit aldol condensation, wherein said inhibiting agent is selected from the group consisting of benzoic hydrazide, hydroperoxides, hydrogen peroxide, salts of hypochlorous acid, nitroalkanes, monoethanolamine, peroxyesters, and N,N-dialkylhydroxylamines.

18. The caustic scrubbing solution of claim 17 wherein said inhibiting agent is selected from the group consisting of benzoic hydrazide, tertiary-butyl hydroperoxide, hydrogen peroxide, NaOCl nitromethane, monoethanolamine, tertiary-butyl perbenzoate, and N,N-diethylhydroxylamine.

19. The caustic scrubbing solution of claim 17 wherein said inhibiting agent is selected from the group consisting further of isothiuronium salts, primary amines, acetophenone, dibutylamine, and iodine.

20. The caustic scrubbing solution of claim 17 wherein said inhibiting agent comprises benzoic hydrazide.

21. The caustic scrubbing solution of claim 17 wherein said inhibiting agent comprises a hydroperoxide.

* * * * *

UNITED STATES PATENT AND TRADEMARK OFFICE
CERTIFICATE OF CORRECTION

PATENT NO. : 5,700,368
DATED : Dec. 23, 1997
INVENTOR(S) : Glenn L. Roof

It is certified that error appears in the above-identified patent and that said Letters Patent is hereby corrected as shown below:

On title page, after item [73] "The terminal disclaimer notice [*]" Should read:
--The portion of the term of this patent subsequent to May 11, 2015 has been disclaimed.--

Signed and Sealed this

Eighteenth Day of August, 1998

*Attest:*

BRUCE LEHMAN

*Attesting Officer*  *Commissioner of Patents and Trademarks*